United States Patent [19]

Busch et al.

[11] 4,195,693

[45] Apr. 1, 1980

[54] DEVICE FOR EXTINGUISHING FIRES FROM THE AIR

[75] Inventors: Heinz Busch, Ottobrunn; Peter Schroder, Hamburg, both of Fed. Rep. of Germany

[73] Assignee: Messerschmitt-Boelkow-Blohm GmbH, Munich, Fed. Rep. of Germany

[21] Appl. No.: 788,662

[22] Filed: Apr. 18, 1977

[30] Foreign Application Priority Data

Apr. 30, 1976 [DE] Fed. Rep. of Germany ....... 2619350

[51] Int. Cl.² .............................................. A62C 39/00
[52] U.S. Cl. ........................................ 169/53; 239/171
[58] Field of Search .................. 239/171, 172; 169/53; 137/616, 616.7; 244/136; 251/294, 349

[56] References Cited

U.S. PATENT DOCUMENTS

| 159,182 | 1/1875 | Jeremiah | 239/172 X |
| 3,698,480 | 10/1972 | Newton | 169/53 X |

FOREIGN PATENT DOCUMENTS

| 477164 | 8/1925 | Fed. Rep. of Germany | 239/171 |
| 701851 | 3/1931 | France | 137/616.7 |

*Primary Examiner*—Robert B. Reeves
*Assistant Examiner*—Michael J. Forman
*Attorney, Agent, or Firm*—Blanchard, Flynn, Thiel, Boutell & Tanis

[57] ABSTRACT

A fire-extinguishing device for use in aircraft. The fire-extinguishing device is comprised of a tank which is received in the cargo compartment of the aircraft and the longitudinal axis of the tank is inclined to the horizontal. The aircraft has a rearwardly opening door and the front end of the tank is elevated at a higher level than is the rear end of the tank located adjacent the rear door to the cargo compartment of the aircraft. A valve is provided at the lower end to control the discharge of the fire-extinguishing media contained within the tank. The valve is adapted to become opened only when the door to the cargo compartment is in the opened position.

2 Claims, 2 Drawing Figures

A (d= 200mm)
B (d= 200mm) 2x
C (d= 300mm)

DEVICE FOR EXTINGUISHING FIRES FROM THE AIR

FIELD OF THE INVENTION

The invention relates to a device for extinguishing fires from the air, in particular large area fires, by means of an aircraft in which one or several containers are provided for the fire-extinguishing means, in particular for water by using for example one cargo aircraft having a rear-loading door and functioning as a fire-extinguishing aircraft and wherein the aircraft is adapted to receive at least one fire-extinguishing standard equipment means therein and which is adjusted with respect to form and lashing devices as far as is necessary to the common airfreight containers.

BACKGROUND OF THE INVENTION

It is known to use aircraft to extinguish large surface area fires, as for example forest fires. These aircraft have so far been primarily special aircraft which were constructed and equipped exclusively for the known purpose. Such an aircraft is described and illustrated for example in U.S. Pat. No. 1,911,431 from the year 1933. The aircraft which is disclosed therein is a high-wing monoplane with two water tanks which are arranged one behind the other in the fuselage. Each tank can be filled by one dip pipe each dipping during flight directly above a water surface into same so that the water is forced into the tanks by the created pressure head. Such a special aircraft, which is designed exclusively for the purpose of fire fighting, is very expensive with respect to manufacture and maintenance and is therefore extremely uneconomical. This disadvantage is particularly bad since in the case of surface fires, like forest fires, at short notice as many fire-extinguishing aircraft must be made available as possible in order to be able to successfully fight a fire. The latter would mean that at all times a fleet of special aircraft must be maintained available for assignment. The money needed for this could be allotted only under considerable sacrifices.

To avoid the shown disadvantages, it has also already been suggested to use a transport aircraft having a rear-loading door, which at short notice can receive a fire-extinguishing standard equipment means, as a fire-extinguishing aircraft. A corresponding notice appeared in AVIATION & MARINE—15, 1975. The known suggestion provides that a fire-extinguishing tank is driven on a suitable flat loader backwardly to the rear-loading door of a FIAT-G 222, which rear-loading door has been lowered to the same loading height. Thus, the tank can be driven easily into the fuselage of the machine and can there be fixed with suitable lashing devices which are usually used to anchor containers.

In the case of all fire-extinguishing devices by means of aircraft the problem exists to drop the fire-extinguishing means, which is usually water, as quickly and compactly as possible above the center of the fire. This means that the respective container must be capable of being emptied sufficiently quickly. This is done inventively in a surprisingly simple manner by constructing the container or tank substantially elongated, by inclining it sloping backwardly, dropping off with respect to its longitudinal axis within the aircraft fuselage, and by providing at the lowermost point of the tank at least one discharge mechanism for the fire-extinguishing means.

Tests have shown that already an inclination of approximately 10 degrees is sufficient to shorten the discharge time of water from an elongated tank by a factor of 4 to 5 compared with it being emptied in a horizontal position. This result is also surprisingly good for a man skilled in the art. It can still be improved when the respective aircraft flies at a certain angle of incidence during emptying of the containers, which angle may in the case of Transall amount to up to 5 degrees. The same effect may cause an acceleration of the aircraft during emptying of the tank.

Details for realizing the invention are contained in the description of the drawing.

BRIEF DESCRIPTION OF THE DRAWING

The invention will now be discussed more in detail with reference to the drawing, in which.

DETAILED DESCRIPTION

Figure 1:
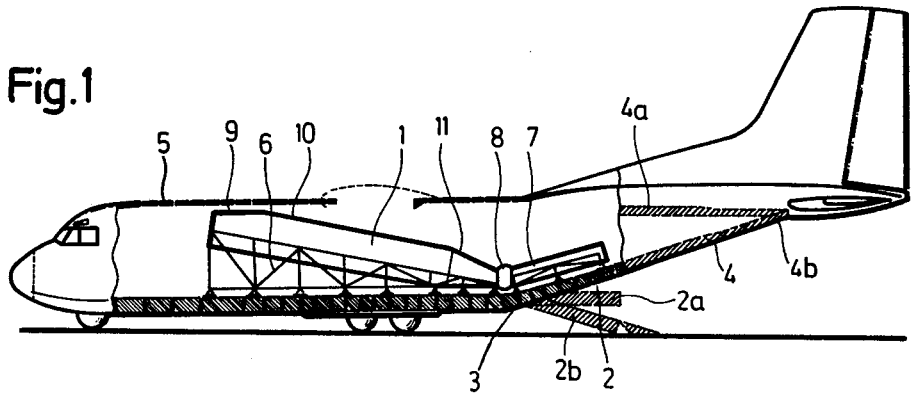
FIG. 1 is a longitudinal cross-sectional view of a cargo aircraft having a rear-loading door to a cargo compartment in which a tank is provided with fire-extinguishing means.

As can be taken from FIG. 1, the tank 1 is inventively arranged inclined downwardly toward the rear of the aircraft cargo compartment of a Transall C 160. The rear-loading door 2, which can be swung out to shaded positions 2a and 2b about a joint or hinge which exists at the point 3 on the aircraft, is in the closed position in FIG. 1. The latter is also true for a further door 4 which can be swung upwardly to the position 4a about a joint or hinge which exists at the point 4b on the aircraft. Thus, one can see from FIG. 1 that a driving of the tank 1 into the fuselage 5 of the aircraft is easily possible if the two doors 2 and 4 are in the positions 2a or 2b and 4a.

As can further be taken from FIG. 1, the tank 1 is within the aircraft fuselage 5 on a frame 6 which is constructed in accordance with the inventively inclined position of the tank 1. In case the frame 6 has rollers and thus forms an undercarriage for the tank 1, the inventive standard equipment can be driven by a suitable vehicle, for example a flat loader, directly into the aircraft fuselage through the rear-loading door 2. However, it is also possible to place the frame 6 without rollers onto a pallet so that the fire-extinguishing standard equipment can be moved on the roller system of the load-storing system installed in the aircraft. The pallet can be locked in the aircraft in the roller system. Furthermore the tank 1 may have ears to anchor the fire-extinguishing unit or the fire-extinguishing standard equipment at the respective locking points in the aircraft. A discharge pipe 7 is swingably connected to the rear end of the tank 1 in the area 8. Furthermore the tank 1 has advantageously a quick-opening valve 12 (FIG. 3) in the area 8, which valve is constructed in the sense of a quick-as-possible tank discharge valve, preferably a flap valve. Through this type of construction, the existing discharge cross section can suddenly be opened. For safety reasons, it is advisable to construct the valve such that it is always closed when in the position shown in FIG. 1; only when the discharge pipe 7 is moved downwardly may the valve be opened so that water or fire-extinguishing means will not inadvertently flow into the aircraft fuselage. It is preferable that during an opening of the door 2 to the position 2b an opening of the valve 12 in the discharge pipe 7 will occur automatically as schematically indicated by broken line 13.

It is understood that in the upper area 9 of the tank 1 closable ventilation openings are provided which on the one hand permit a quick emptying of the tank because air is permitted to enter the tank as water or the like is discharged and, on the other hand, offers the possibility that the tank 1 can be emptied at times yet faster by supplying pressurized air thereto, for example by utilizing the pressure head. Also the devices for filling the tank can be connected to the upper area 9.

The splashing of the fire-extinguishing fluid is reduced to a tolerable degree by baffle plates inside the tank.

The tank 1 which is illustrated in FIG. 1 is sloped 11 degrees inside of the aircraft fuselage with respect to its longitudinal axis downwardly toward the rear. The tank has in correspondence with the carrying capability of the aircraft (Transall) a capacity of 13,500 liters, a length of approximately 8 m. and a cylindrical cross section of approximately 1.5 m. diameter. The cylindrical part 10 of the tank 1 is tapered on the discharge end into a frustum-shaped transition piece 11 toward the discharge pipe 7. The latter is approximately 3.5 m. long and it has an oval cross section of approximately 0.6 m.×1.5 m. In the case of a vertically low cross section, it is possible to throw the water off also when the loading gate (door 4) is closed, namely in the case of a little turbulent tail flow.

Figure 2:
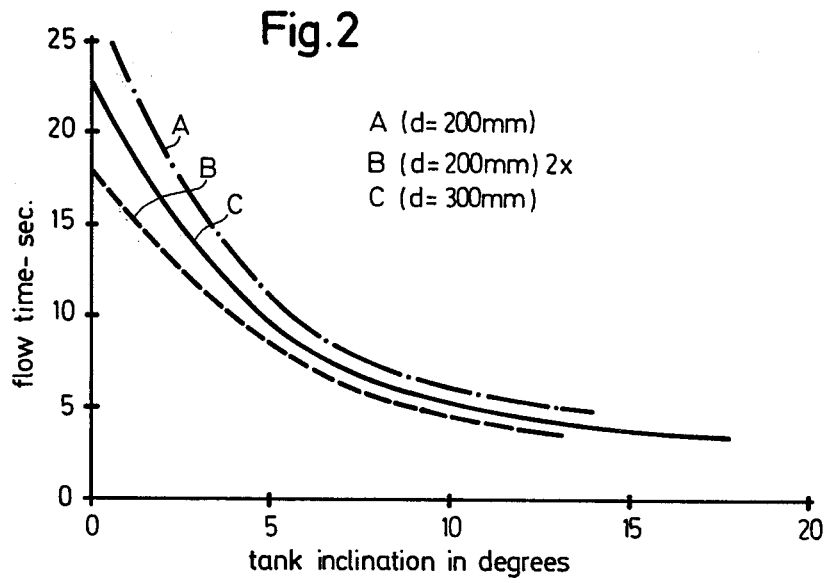
FIG. 2 illustrates a diagram to explain the flow time of the fire-extinguishing means in relation to the inclination of the tank in the aircraft.

The diagram according to FIG. 2 indicates in three characteristic curves A, B and C the inventive advance in the art, namely clarifying how flow time in seconds relates to tank inclination in degrees. The flow measurements took place on a model tank with cylindrical cross section, which was approximately 250 cm. long and had a diameter of approximately 50 cm. The different curves A-B resulted from the different outlet cross sections in the discharge pipe, which in the case of the curve A had a diameter of 200 mm., in B 2×200 mm. and in C 300 mm.

The invention is not limited to the illustrated example. It is also conceivable to successfully use within the scope of the invention solid materials, like sand bags or containers with loose sand for fire fighting from the air.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for extinguishing of surface fires from the air by means of an aircraft having a cargo compartment and a rear-loading door providing access to said cargo compartment and at least one transportable fire-extinguishing standard equipment means mounted in said cargo compartment, said fire-extinguishing standard equipment means including at least one tank housing fire-extinguishing means therein, the improvement comprising wherein the bottom wall of said tank is substantially elongated, extending substantially coextensively with the longitudinal axis of said aircraft over a major portion of said bottom wall of said cargo compartment, and is inclined sloped downwardly toward said rear-loading door, wherein at the lowermost point of said bottom wall of said tank there is provided at least one discharge mechanism for facilitating a discharge of said fire-extinguishing means from said tank, and wherein the angle of inclination of said bottom wall of said tank is in the range of 10 to 15 degrees with respect to the bottom wall of said cargo compartment, wherein said discharge mechanism includes a discharge pipe and a valve, said discharge pipe being connected swingably to said tank adjacent said valve, and wherein said discharge pipe is connected to said door of said aircraft so that during an opening of said door, said discharge pipe will be swung therewith to a position below the level of said tank.

2. The improved device according to claim 1, wherein said valve includes means for effecting an opening thereof in response to a movement of said door to said opened position and said discharge pipe is swung therewith.

* * * * *

UNITED STATES PATENT AND TRADEMARK OFFICE
CERTIFICATE OF CORRECTION

PATENT NO. : 4,195,693

DATED : April 1, 1980

INVENTOR(S) : Heinz Busch, et al

It is certified that error appears in the above—identified patent and that said Letters Patent is hereby corrected as shown below:

Change name of inventor "Peter Schroder" to -- Peter Schroeder --

On the title page, below the Abstract, "2 Drawing Figures" should read -- 3 Drawing Figures --

Figure 3:
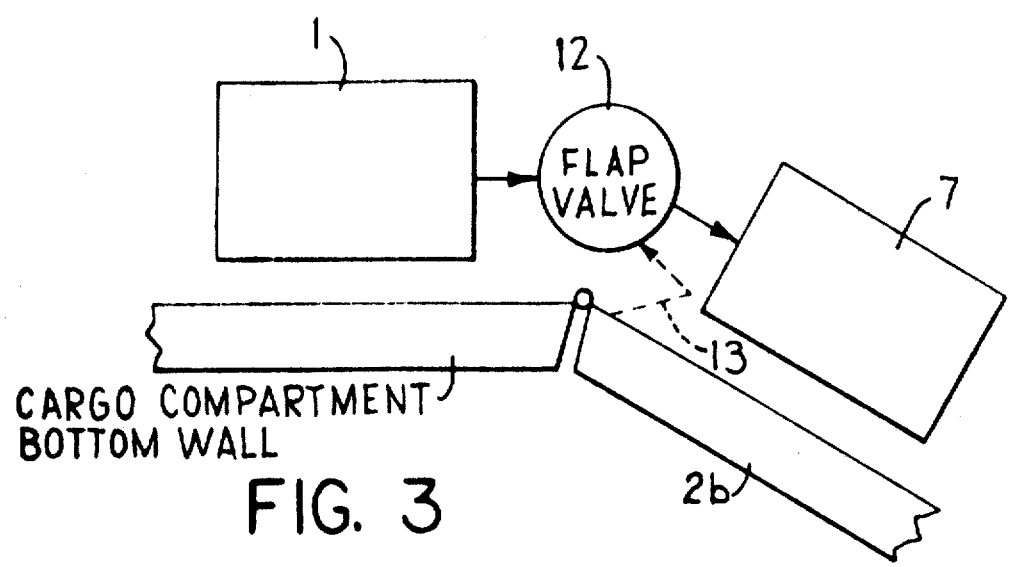
FIG. 3 is a schematic showing of a discharge valve construction.

The attached sheet of drawing containing Figure 3 should be added.

*Signed and Sealed this*

*Fifteenth* Day of *July 1980*

[SEAL]

*Attest:*

SIDNEY A. DIAMOND

*Attesting Officer*  *Commissioner of Patents and Trademarks*